United States Patent
Dax et al.

(10) Patent No.: US 11,090,901 B2
(45) Date of Patent: Aug. 17, 2021

(54) MULTILAYER SHEET STRUCTURE

(71) Applicant: DUPONT SAFETY & CONSTRUCTION, INC., Wilmington, DE (US)

(72) Inventors: Daniel Dax, Kehlen (LU); Corneille Schmitz, Lenningen (LU); Serge Rebouillat, Echenevex (FR)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 91 days.

(21) Appl. No.: 16/263,372

(22) Filed: Jan. 31, 2019

(65) Prior Publication Data

US 2020/0247087 A1    Aug. 6, 2020

(51) Int. Cl.
*B32B 3/10*    (2006.01)
*B32B 5/26*    (2006.01)
*B32B 5/02*    (2006.01)

(52) U.S. Cl.
CPC ............... *B32B 5/26* (2013.01); *B32B 5/022* (2013.01); *B32B 2262/0253* (2013.01); *B32B 2262/12* (2013.01); *B32B 2410/00* (2013.01)

(58) Field of Classification Search
None
See application file for complete search history.

(56) References Cited

U.S. PATENT DOCUMENTS

| | | | |
|---|---|---|---|
| 5,308,691 A | 5/1994 | Lim et al. | |
| 6,797,655 B2 | 9/2004 | Rudisill | |
| 9,580,845 B2 | 2/2017 | Ashraf | |
| 9,972,913 B2 * | 5/2018 | Kato | H05K 9/0084 |
| 2006/0141886 A1 | 6/2006 | Brock et al. | |
| 2010/0062671 A1 * | 3/2010 | Child | B32B 5/06 |
| | | | 442/382 |
| 2015/0114546 A1 * | 4/2015 | Claasen | B32B 5/26 |
| | | | 156/73.1 |

FOREIGN PATENT DOCUMENTS

| | | |
|---|---|---|
| EP | 1637317 A1 | 3/2006 |
| GB | 2518055 A | 3/2015 |
| WO | 95/15848 A1 | 6/1995 |
| WO | 2010028238 A1 | 3/2010 |
| WO | 2015061417 A2 | 4/2015 |

OTHER PUBLICATIONS

PCT International Search Report, mailed Apr. 2, 2020, for international Application No. PCT/US2020/015964, Filed Jan. 30, 2020. ISA/EPO, Mazet, Jean-Francois, Authorized Officer.

* cited by examiner

*Primary Examiner* — Christopher M Polley

(57) ABSTRACT

A fibrous multilayer sheet structure comprising at least one discontinuous fibrous layer having first and second surfaces and at least one layer of continuous melt spun fibers on the first surface of at least one of the at least one discontinuous fibrous layers wherein the fibers of the discontinuous fibrous layer are not melt blown fibers.

14 Claims, 3 Drawing Sheets

MULTILAYER SHEET STRUCTURE

BACKGROUND OF THE INVENTION

Field of the Invention

This invention pertains to a multilayer fibrous sheet structure.

2. Description of Related Art

U.S. Pat. No. 5,308,691 to Lim et al discloses controlled porosity composite sheets comprising a melt-blown polypropylene fiber web having a spunbonded polypropylene fiber sheet laminated to at least one side thereof that are made by calendering an assembly of the component webs in such a manner that, when a two-layer composite sheet is made, the web of melt-blown fibers is in contact with a metal roll heated to 140 to 170 degrees C. operating against an unheated resilient roll; and, when a three layer composite sheet is made, the spunbonded web in contact with the heated metal roll has a dtex per fiber value of less than 6. These composite sheets have a Gurley-Hill porosity of about 5-75 seconds, excellent mechanical and tear strengths, high water vapor penetration rate, and low liquid water permeability. They are particularly suitable for making housewrap sheets and sheets for sterile packaging.

U.S. Pat. No. 6,797,655 to Rudisill teaches a meltblown fiber comprising at least 20% by weight polyester selected from the group consisting of poly(ethylene terephthalate) having an intrinsic viscosity of less than 0.55 dl/g and poly(trimethylene terephthalate) having an intrinsic viscosity of less than 0.80 dl/g. The meltblown fibers are collected as a web that can be incorporated into composite sheet structures.

U.S. Pat. No. 9,580,845 to Ashraf describes a nonwoven substrate with at least two layers of fibers (each having top and bottom surfaces). The nonwoven substrate may comprise at least one layer of spunbond fibers. The nonwoven substrate may comprise at least two layers of spunbond fibers. Further, the nonwoven substrate may comprise at least one layer of carded fibers and one layer of meltblown fibers. Further, the nonwoven substrate may comprise at least one layer of microfibers. In an embodiment, any of the layers of fibers, including spunbond fibers, carded fibers, meltblown fibers, or microfibers may comprise or be made of monocomponent, bicomponent, or multicomponent fibers. In an embodiment, the nonwoven substrate may comprise a polyolefin, such as polypropylene or polyethylene.

BRIEF SUMMARY OF THE INVENTION

This invention pertains to a fibrous multilayer sheet structure comprising at least one discontinuous fibrous layer having first and second surfaces and at least one layer of continuous melt spun fibers on the first surface of at least one of the at least one discontinuous fibrous layers wherein the fibers of the discontinuous fibrous layer are not melt blown fibers.

DETAILED DESCRIPTION OF THE INVENTION

Multilayer Sheet Structure

Figure 1:
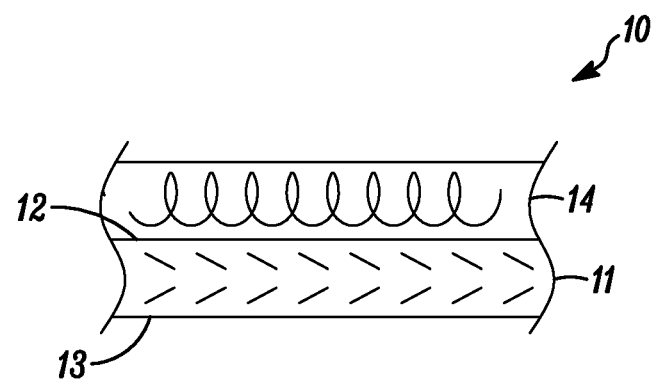
FIG. 1 is a sectional view of a first embodiment of the invention.

FIG. 1 shows a sectional view 10 of a first embodiment of the invention. The fibrous multilayer sheet structure 10 comprises a discontinuous fibrous layer 11 having first and second surfaces, 12 and 13 respectively, and one layer 14 of continuous melt spun fibers on the first surface 12 of the discontinuous fibrous layer 11.

Figure 2:
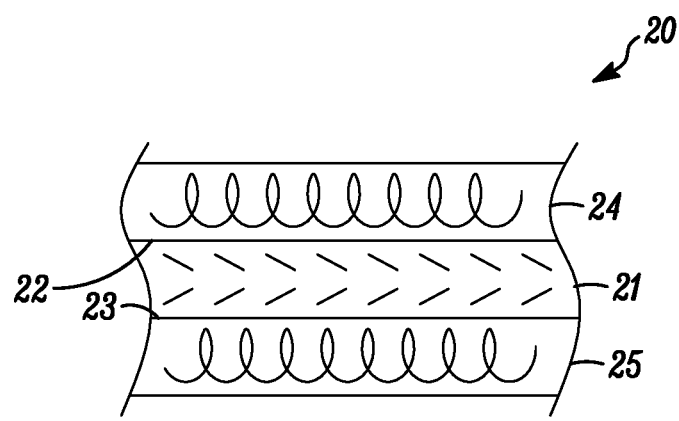
FIG. 2 is a sectional view of a second embodiment of the invention.

FIG. 2 shows a sectional view 20 of a second embodiment of the invention. The fibrous multilayer sheet structure 20 comprises a discontinuous fibrous layer 21 having first and second surfaces, 22 and 23 respectively, one layer 24 of continuous melt spun fibers on the first surface 22 of the discontinuous fibrous layer 21 and a further layer 25 of continuous melt spun fibers on the second surface 23 of the discontinuous fibrous layer 21.

Figure 3:
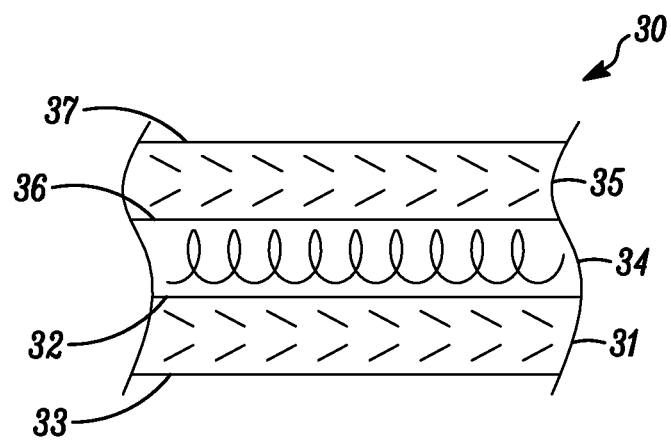
FIG. 3 is a sectional view of a third embodiment of the invention.

FIG. 3 shows a sectional view 30 of a third embodiment of the invention. The fibrous multilayer sheet structure 30 comprises a first discontinuous fibrous layer 31 having first and second surfaces, 32 and 33 respectively, one layer 34 of continuous melt spun fibers on the first surface 32 of the discontinuous fibrous layer 31 and a second discontinuous fibrous layer 35 having first and second surfaces, 36 and 37 on the surface of continuous fiber layer 34 remote from the first discontinuous fibrous layer 31.

Figure 4:
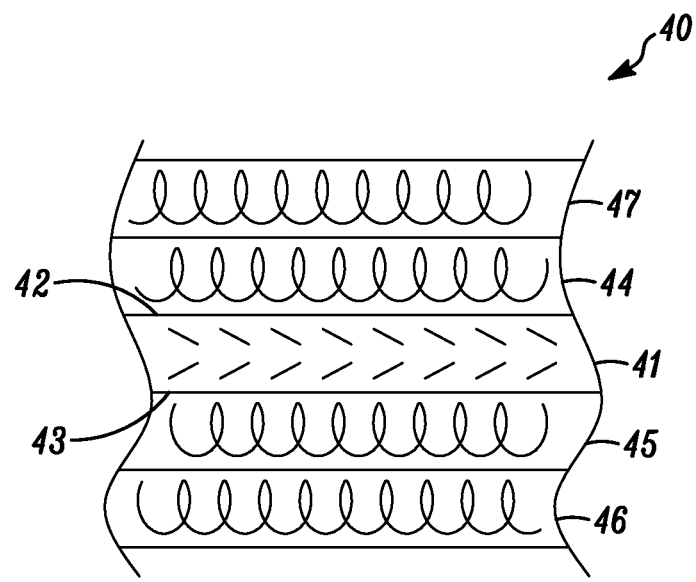
FIG. 4 is a sectional view of a fourth embodiment of the invention.

FIG. 4 shows a sectional view 40 of a fourth embodiment of the invention. The fibrous multilayer sheet structure 40 comprises a discontinuous fibrous layer 41 having first and second surfaces, 42 and 43 respectively. An assembly comprising two layers 44 and 47 of continuous melt spun fibers is located on the first surface 42 of the discontinuous fibrous layer 41 and an assembly comprising two layers 45 and 46 of continuous melt spun fibers is located on the second surface 43 of the discontinuous fibrous layer 41.

Other embodiments may also be envisaged such as CCDDCC, CDCDC, CCCDDCC or CDDCDDC where C is a layer of continuous melt spun fibers and D is a discontinuous fibrous layer.

In one embodiment of a CCDCC structure, the D layer has an areal weight of no greater than 30 gsm. Typically, the multilayer sheet structure has an areal weight of no greater than 100 gsm, an air permeability of no greater than 100 $m^3$ $m^{-2}$ $min^{-1}$ and a pore size no greater than 150 micrometers. More preferably the pore size is no greater than 120 micrometers.

In yet another embodiment of a CCDCC structure, the D layer has an areal weight of no greater than 100 gsm. The sheet structure has an areal weight of no greater than 600 gsm, an air permeability of no greater than 100 $m^3$ $m^{-2}$ $min^{-1}$ and a pore size no greater than 150 micrometers. More preferably the pore size is no greater than 120 micrometers.

Figure 6:
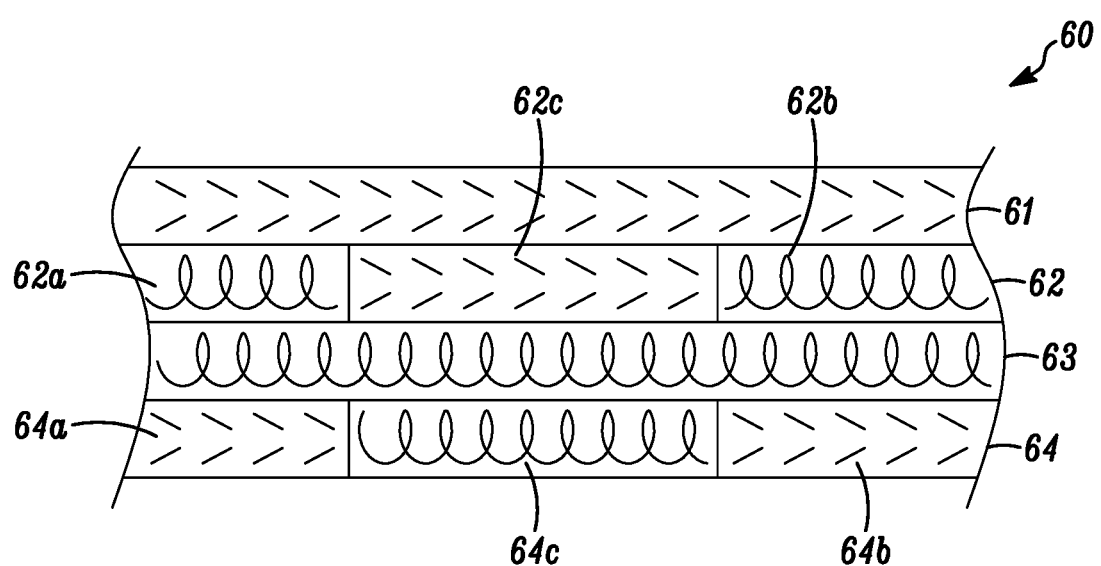
FIG. 6 is a sectional view of a fifth embodiment of the invention.

FIGS. 1 to 4 show examples of this invention wherein each single layer of the sheet structure such as 31, 34 and 35 is either a discontinuous fibrous layer or a layer of continuous fibers, in other words 31,34,35 are respectively D,C,D. Other sheet structure constructions can be envisaged in which, within a layer of the structure, there is a blend of continuous and discontinuous fibrous components. These can be considered as interlocking regions or intermingling layers. One example of this is shown generally at 60 in FIG. 6. Layer 61 is a layer solely comprising discontinuous fibers while layer 63 is a layer solely comprising continuous fibers. Layers 62 and 64 are blended layers comprising both continuous and discontinuous fiber regions within each layer. Layer 62 comprises continuous fiber regions at 62*a* and 62*b* and a discontinuous fiber region at 62*c*. Layer 64 comprises a continuous fiber region at 64*c* and discontinuous fiber regions at 64*a* and 64*b*. Many combinations of continuous and discontinuous fiber regions within a layer are possible. These may be primarily oriented in the machine or cross-machine directions. Based on nomenclature used in this description, the illustrative example of FIG. 6 can be described for layers 61-64 respectively as a D(CDC)C (DCD) multilayer sheet structure.

In other embodiments, each discontinuous fibrous layer has an areal weight range of from 5 gsm to 100 gsm. In yet other embodiments, the total areal weight of each continuous melt spun filamentary layer ranges from 5 gsm to 500 gsm.

The C and D layers may be of the same or different chemical composition.

Discontinuous Fibrous Layer

The fibers of the discontinuous fibrous layer are not melt blown fibers. Melt blowing is a method of making micro- and nanofibers where a polymer melt is extruded through small nozzles surrounded by high speed blowing gas. The randomly deposited fibers form a nonwoven sheet product.

The discontinuous fibers include pulps and nanofibers. In this context, a nanofiber is a fiber having at least one-dimension of less than one micrometer.

The discontinuous fibers may be synthetic fibers, natural fibers or blends thereof. Exemplary synthetic fibers include polyolefins and olefin copolymers (for example polypropylene, metallocene polypropylene or polyethylene), polyester, polysulfone, polyethersulfone, polyphenylsulfone, polyvinylidene fluoride, polylactic acid, polyvinylidene difluoride, polyimide, polyacrylonitrile, aromatic polyamide, ethylenevinyl alcohol copolymer, cellulose acetate or combinations thereof. The above synthetic or natural fibers may also be a bicomponent or multicomponent fiber which, in some embodiments, may be in the form of a sheath-core fiber or one in which the two components are side-by-side. In this latter case, the two-side-by side components may be twisted together. Exemplary natural fibers include cellulose, cellulosic fiber precursors, such as non-lignin free cellulose, and cellulose derivatives such as cotton, wood pulp, flax, hemp and viscose fibers as traditionally described (for example Wikipedia link https://en.wikipedia.org/wiki/List_of_textile_fibres) being for example from vegetable or animal sources. In some embodiments, discontinuous fibers have a length not exceeding 12 mm and a filament diameter not exceeding 11 dtex (10 denier). Cellulose acetate is also a suitable material for fiber. In a further embodiment, blends of natural and synthetic discontinuous fibers are used.

The discontinuous fibers may be monocomponent, bicomponent or multicomponent fibers, such terms being well known in the textile art. In one embodiment, the fiber may be a bicomponent fiber having a polypropylene core and a lower melting polymer sheath or a polyester core and a lower melting co-polyester or polyolefin sheath.

In some embodiments, at least one of the discontinuous fibrous layers comprises fibers of different dimensions i.e. length and/or diameter.

In some embodiments, the discontinuous fibrous layer has an areal weight of from 5 to 100 gsm.

Melt Spun Continuous Fibrous Layer

The melt spun fibrous layer comprises continuous synthetic or embedded bio-based fibers. Further information on bio-based fibers may be found at a Wikipedia link: https://en.wikipedia.org/wiki/Bio-based_material. One such fiber is Sorona® available from Dow DuPont. In the context of this invention the terms fiber and filament are interchangeable.

In melt spinning, the fiber-forming substance is melted for extrusion through a spinneret and then directly solidified by cooling. Melt spinning uses the heat to melt the polymer to a viscosity suitable for the extrusion through the spinneret. It is used for the polymers that are not decomposed or degraded by temperatures necessary for extrusion.

Preferably the continuous melt spun fibers are polyolefins and olefin copolymers (such as polypropylene, metallocene polypropylene or polyethylene), polysulfone, polyethersulfone, polyphenylsulfone, polyvinylidene fluoride, polyvinylidene difluoride, polyimide, polyacrylonitrile, polyester, aromatic polyamide, ethylenevinyl alcohol copolymer or cellulose acetate.

Exemplary bio-based fibers include polylactide and cellulose derivatives which are chemically and/or biologically modified forms of cellulose that are for example used in food processing (see Encyclopedia.com at https://www.encyclopedia.com/education/dictionaries . . . pictures . . . /cellulose-derivatives).

The continuous fibers may be monocomponent, bicomponent or multicomponent. In some embodiments, the continuous melt spun fibrous layer has an areal weight of from 5 to 500 gsm.

In some embodiments, at least one of the continuous fibrous layers comprises fibers of different dimensions i.e. diameter and/or cross section and may further comprise nanoparticles.

Method of Making a Sheet Structure

Figure 5:
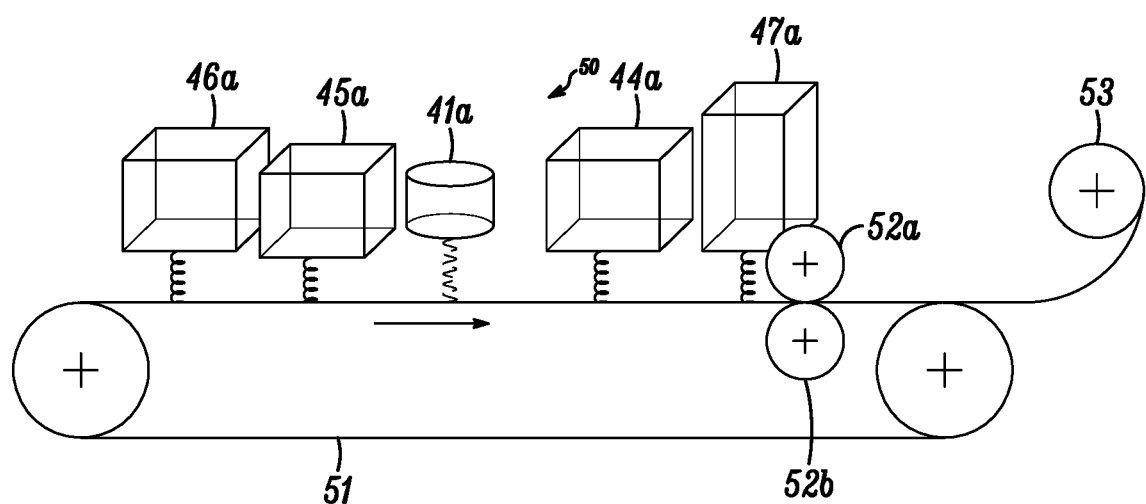
FIG. 5 is a schematic of one method of making a sheet structure of the invention.

Preferably the sheet structure is made by a method in which the discontinuous and continuous fiber layers are formed and consolidated in a one-step process. Such a method is shown in FIG. 5 which is a schematic of a process suitable for making the sheet structure described in FIG. 4.

The equipment consists of a laydown belt such as a continuous belt 51. The belt moves in the direction of the arrow. Above the belt are the required number of units necessary to make the desired number of continuous and discontinuous fibrous layers in the sheet structure. In FIG. 5, units 44*a*-47*a* are those to produce layers 44-47 respectively in the sheet structure of FIG. 4. Unit 41*a* produces the layer 41 of FIG. 4. The positioning or number of those units can be varied to produce sheet structures of different layer configurations. Any suitable commercial unit for spinning continuous fibers and for making discontinuous fibers may be used. After the last layer has been laid down, in this case layer 47, the unconsolidated sheet structure is fed through a consolidating or calendaring process such as a pair of rolls 52*a* and 52*b*. Sometimes roll 52*b* may be replaced by a table. The temperature of the rolls and pressure applied at the roll nip is adjusted to provide the necessary level of consolidation. The rolls are commonly made of steel, or one of steel and one having a rubber sleeve. Such a process is widely known in the lamination art. 52*a* and 52*b* can also a combination of a perforated steel drum applying saturated steam to the fibrous sheet structure which is pressed against a rubber back-up roll. A similar type of thermal bonding can also be obtained by through-gas bonding.

Article

A wide range of articles can be made using the multilayer sheet structures described herein. These include, but are not limited to, geotextiles such as for drainage, landscaping structures or sport ground components; piezoelectric textiles; energy harvesting areas; advertising designs; medical packaging; filtration; gas storage vessels; building materials such as house wrap, walling and under-roofing covers; sound insulating or absorption materials; a filtering material such as food filters, air filters, liquid filters, vacuum cleaner filters; membrane support; hygiene or medical materials such as protective clothing, disposable diapers, sterilization wraps, medical filters or desiccant packs.

Test Methods

Tensile strength and elongation was measured according to DIN EN 29073-3 (1992). Basis weight (mass per unit area) was measured according to BS EN ISO 9864 (2005). Determination of the thickness of each layer was determined according to EN ISO 9863-1 (2016).

Determination of the characteristic opening (pore) size of a sheet structure was performed according to EN ISO 12956 (2010) based on calibrated sand grain sieving. The O90 is an optical method to determine the opening (pore) size and is correlated to ISO 12956 (2010). Test method for trapezoid tearing strength of a sheet structure was measured according to ASTM D4533-91 (1996).

Air permeability of textile fabrics was determined as per ISO 9237:1995.

EXAMPLES

The following examples are given to illustrate the invention and should not be interpreted as limiting it in any way. All parts and percentages are by weight unless otherwise indicated. Examples prepared according to the process or processes of the current invention are indicated by numerical values. Control or Comparative Examples are indicated by letters. Data and test results relating to the Comparative and Inventive Examples are shown in Tables 1 to 4.

In the tables, "SST MD" is the tensile strength (using 50×200 mm samples) by test method DIN EN 29073-3 (1992) in the machine direction and "SST XD" is the tensile strength (using 50×200 mm samples) in the cross-machine direction. "Elong MD" is the elongation at break in the machine direction and "Elong XD" is the elongation at break in the cross-machine direction. "TTMD" is the trapezoid tear in the machine direction and "TTXD" is the trapezoid tear in the cross-machine direction. "Air Perm" is air permeability. "O90" and "O90E" are the pore size measurements, determined by optical means and physical separation (sieving) respectively. Machine direction and cross-direction are well known terms in the laminating and textile arts.

Samples were measured on at 17 different places for each sheet structure and the values quoted are the average of these values.

All examples were made on a 600 mm wide conventional lay-down machine.

Example 1

Example 1 was a CCDCC construction having a total areal weight of 78 gsm. The combination of C layers replicated Typar® 3207 spunbonded nonwoven fabric of continuous polypropylene filaments commercially available from Dow DuPont, Wilmington, Del. and having an areal weight of 68 gsm. The fiber of the D layers was polypropylene. The D layer weighed 10 gsm and comprised short melt spun fibers (i.e. not melt blown) of polypropylene having a nominal dtex of 1.7 (1.5 denier). The sheet structure was made as outlined in FIG. 5 and subsequent description.

Comparative Example A

The sheet structure was a Dow DuPont commercial product, Typar® 3207, having a four layer CCCC construction and weighing 68 gsm. Each layer comprised spunbonded nonwoven fabric of continuous polypropylene filaments. The sheet structure was made as outlined in FIG. 5 and subsequent description except that element 41 was omitted.

Comparative Example B

The sheet structure weighing 150 gsm was also a CCCC construction comprising four layers and is a commercially available spunbonded nonwoven fabric of continuous polypropylene filaments. The material is available from Dow DuPont as Typar® SF44. The sheet structure was made as outlined in FIG. 5 and subsequent description except that element 41 was omitted.

The properties of these three examples are summarized in Tables 1 and 2.

TABLE 1

| Example | Layer D Fiber Type | Layer D Fiber Amount (gsm) | Sheet Structure Weight (gsm) |
|---|---|---|---|
| Example 1 | Polypropylene | 10 | 78 |
| Comparative A | None | 0 | 68 |
| Comparative B | None | 0 | 150 |

TABLE 2

| Example | SST MD (N) | Elong MD (%) | SST XD (N) | Elong XD (%) | TTMD (N) | TTXD (N) | Air Perm ($m^3 m^{-2}\ min^{-1}$) | O90 (microns) |
|---|---|---|---|---|---|---|---|---|
| 1 | 191 | 44 | 185 | 50 | 165 | 156 | 58 | 81 |
| Comp. A | 146 | 38 | 140 | 47 | 163 | 179 | 141 | 127 |
| Comp. B | 398 | 40 | 441 | 40 | 375 | 380 | 80 | 80 |

Example 2

Example 2 was a CCDCC construction having a total areal weight of 84 gsm. The total areal weight of all four C layers was 74 gsm. The layers were similar to Typar® 3207 previously described but of a lower areal weight. The D layer weighed 10 gsm and comprised short melt spun bicomponent fibers having a polypropylene core and a polyethylene sheath. The fiber had a nominal dtex of 1.7 (1.5 denier). The sheet structure was made as outlined in FIG. 5 and subsequent description.

Comparative Example C

The multilayer sheet structure was a CCCC construction weighing 240 gsm and comprised four layers. Such a structure is commercially available as Typar® SF70 from Dow DuPont. Each layer comprised spunbonded nonwoven fabric of continuous polypropylene filaments. The multilayer sheet structure was made as outlined in FIG. 5 and subsequent description except that element 41 was omitted.

Comparative Example D

The multilayer sheet structure was a CCCC construction weighing 125 gsm and comprised four layers. Such a structure is commercially available as Typar® VD37 from Dow DuPont. Each layer comprises spunbonded nonwoven sheets of continuous polypropylene filaments. The multilayer was made as outlined in FIG. 5 and subsequent description except that element 41 was omitted.

Comparative Example E

The multilayer sheet structure was a CCCC construction weighing 90 gsm and comprised four layers. Such a structure is commercially available from Dow DuPont as Typar® SF27. Each layer comprises spunbonded nonwoven sheets of continuous polypropylene filaments. The multilayer was made as outlined in FIG. 5 and subsequent description except that element 41 was omitted.

The properties of these four examples are summarized in Tables 3 and 4.

TABLE 3

| Example | Layer D Fiber Type | Layer D Fiber Amount (gsm) | Sheet Structure Weight (gsm) |
|---|---|---|---|
| Example 2 | Polypropylene Core & Polyethylene Sheath | 10 | 84 |
| Comparative C | None | 0 | 240 |
| Comparative D | None | 0 | 125 |
| Comparative E | None | 0 | 90 |

The results shown in the above tables illustrate the advantages of the inventive concept. Two features are particularly noticeable when the characteristics of sheet structures are "normalized" by basis weight, this type of normalization comparison being very common in the textile industry: (i) for a lower basis weight, the inventive samples offer either an improved or comparable mechanical strength and (ii) for a lower basis weight, the inventive samples offer either a reduced or comparable pore size which is a relevant property for many industrial applications.

We claim:

1. A fibrous multilayer sheet structure comprising at least one discontinuous fibrous layer consisting of synthetic pulp, the layer having first and second surfaces and at least one layer of continuous melt spun fibers on the first surface of at least one of the at least one discontinuous fibrous layers wherein the fibers of the discontinuous fibrous layer are not melt blown fibers and are of polyethylene, polypropylene, metallocene, olefin copolymers, polyester or blends thereof.

2. The sheet structure of claim 1 further comprising at least one layer of continuous melt spun fibers on the second surface of the discontinuous fibrous layer.

3. The sheet structure of claim 1 wherein the continuous melt spun fibers are polypropylene, metallocene, polyester or combinations thereof.

4. The sheet structure of claim 1 wherein the continuous and discontinuous fibers are monocomponent, bicomponent or multicomponent.

5. The sheet structure of claim 1 wherein the discontinuous and continuous fiber layers are formed and consolidated in a one-step process.

6. The sheet structure of claim 1 wherein the discontinuous fibrous layer has an areal weight of from 5 to 100 gsm.

7. The sheet structure of claim 1 wherein at least one continuous fibrous layer has an areal weight of from 5 to 500 gsm.

8. The sheet structure of claim 1 wherein the structure comprises at least two discontinuous fibrous layers each discontinuous fibrous layer having first and second surfaces, each discontinuous fibrous layer being separated from an adjacent discontinuous fibrous layer by at least one layer of continuous melt spun fibers.

9. The sheet structure of claim 1 wherein the continuous or discontinuous fibers are monocomponent, bicomponent or multicomponent.

10. The sheet structure of claim 1 wherein at least one layer comprises both continuous and discontinuous fiber regions.

11. An article comprising the sheet structure of claim 1.

12. The article of claim 11 wherein the article is a geotextile or landscaping structure.

13. A fibrous multilayer sheet structure comprising at least one discontinuous fibrous layer comprising synthetic nanofibers, the layer having first and second surfaces and at least one layer of continuous melt spun fibers on the first surface

TABLE 4

| Example | SST MD (N) | Elong MD (%) | SST XD (N) | Elong XD (%) | TTMD (N) | TTXD (N) | Air Perm ($m^3 m^{-2} min^{-1}$) | O90 ($\mu$) | O90E ($\mu$) |
|---|---|---|---|---|---|---|---|---|---|
| 2 | 237 | 38 | 237 | 39 | 133 | 158 | 40 | 75 | 71 |
| Comp. C | 720 | 48 | 772 | 43 | 544 | 539 | 76 | 62 | 77 |
| Comp. D | 422 | 42 | 362 | 42 | 236 | 164 | 16 | 61 | 71 |
| Comp E | 227 | 29 | 227 | 38 | 226 | 226 | 87 | 112 | nm | nm = not measured of at least one of the at least one discontinuous fibrous layers wherein the fibers of the discontinuous fibrous layer are not melt blown fibers and are of polyethylene, polypropylene, metallocene, olefin copolymers, polyester or blends thereof.

14. The sheet structure of claim 1 wherein the continuous melt spun fibers are polypropylene, metallocene, polyethylene, olefin copolymers, polyester, or combinations thereof.

\* \* \* \* \*